June 23, 1970 G. S. PICUS ET AL 3,517,244
BULK CRYSTAL SEMICONDUCTOR ELECTROLUMINESCENT LIGHT SOURCE
Filed Jan. 22, 1968 2 Sheets-Sheet 1

Gerald S. Picus,
Lynette B. Van Atta,
INVENTORS.
BY
Charles S. Haughey
ATTORNEY.

United States Patent Office 3,517,244
Patented June 23, 1970

3,517,244

BULK CRYSTAL SEMICONDUCTOR ELECTRO-LUMINESCENT LIGHT SOURCE

Gerald S. Picus, Woodland Hills, and Lynette B. Van Atta, Malibu, Calif., assignors to Hughes Aircraft Company, Culver City, Calif., a corporation of Delaware Filed Jan. 22, 1968, Ser. No. 699,702
Int. Cl. H01j *1/62, 63/04*
U.S. Cl. 313—108 4 Claims

ABSTRACT OF THE DISCLOSURE

Bulk recombination radiation is produced in polar, direct bandgap semiconductor materials by application of high electrical fields. With further increases in field, radiation increases at a superlinear rate, producing superradiance.

This invention relates to a bulk recombination radiation source utilizing a polar, direct bandgap semiconductor material in a high electrical field.

Recombination in direct bandgap semiconductor material, with release of photons, is known, and has been associated with injection and resulting recombination in p-n junctions. Such radiation sources are relatively weak, very limited in total energy released, and the active light radiating area is relatively small, associated with the p-n junction.

The phenomenon of impact ionization is often found in materials which produce the Gunn effect, as described by J. B. Gunn, "Microwave Oscillations of Current in III–V Semiconductors," Solid State Comm., vol. 1, pp. 88–91, September 1963. Due to the limiting Gunn effect, such oscillations preclude bulk current breakdown throughout the crystal due to impact ionization. When such materials are sufficiently highly doped to suppress the Gunn effect, high electrical fields can be utilized to produce bulk recombination radiation.

In this invention radiation is produced throughout a bulk single crystal by recombination of electrons and holes that are generated by impact ionization when an electric field exceeding the threshold for producing current break down is applied and with relatively little increase in the electric field above the threshold the intensity of radiation increases superlinearly and superradiance is observed.

For consideration of what we believe to be novel and our invention, attention is directed to the following portion of this specification, including the drawings, which describes the invention and the manner and process of using it.

In the drawings:

FIG. 1 schematically represents the basic circuit for producing bulk recombination radiation according to our invention;

Although a variety of semiconductor materials may be used according to this invention to produce a bulk recombination electroluminescent light source, the invention will be illustrated with simplified equipment as applied to an indium doped cadmium-telluride semiconductor crystal. Such a crystal will be heavily n-type, but normally contains p-type dopant in partial compensation.

Figure 1:
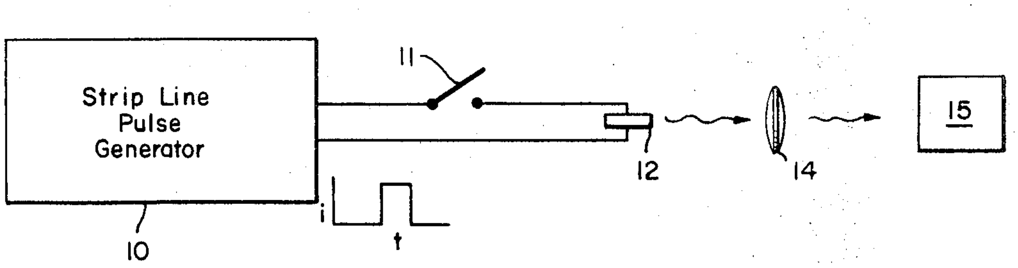

As illustrated schematically, in FIG. 1, the apparatus used to produce bulk recombination radiation may comprise essentially a strip line pulse generator 10, a mechanical, single pole switch 11, and a suitable semiconductor crystal 12. Infrared radiation is collected by a lens system 14 and focused on a photomultplier 15. A monochromator may be inserted after the lens system to measure spectral distribution of the output light, and the voltage output amplified and fed to a strip chart, not shown, may be used to monitor conditions such as total light output.

Figure 2:
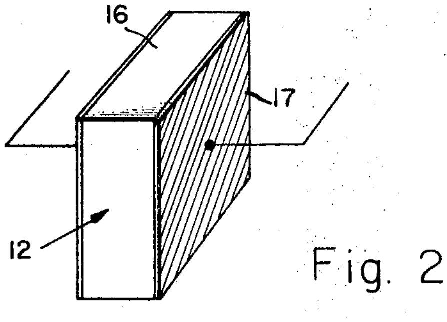
FIG. 2 illustrates a crystal used in the circuit of FIG. 1.

The crystal used is bulk material, not requiring a p-n junction, and as illustrated in FIG. 2 for heavily indium doped cadmium telluride, a crystal 16 approximately 0.6 mm. and 0.8 mm. in cross section and 0.3 mm. in the direction of current travel is provided with indium-silver soldered contacts 17 on clean, preferably original cleavage, faces.

Recombination radiation from electron-hole pairs generated by impact ionization has been observed in heavily doped CdTe at electric field intensities higher than those required to produce Gunn oscillations in lightly doped material. The supression of the Gunn effect in the more heavily doped CdTe is attributed to a decrease in the magnitude of the negative differential mobility displayed by the drift velocity vs. electric field characteristic resulting from the presence of ionized impurity scattering, which dominated the mobility in this material.

Gunn-type current instabilities have been found in samples from an undoped CdTe ingot grown by the Bridgeman technique. The boule was n-type with a room temperature carrier concentration of $5\times10^{14}$ cm.$^{-3}$, and a mobility of 900 cm./volt-sec. (curve C). The ordinate, $g(\lambda)$, represents an arbitrary function of $\lambda$ which is proportional to the intensity of radiation at selected electron voltage shown on a scale of unity for comparison purposes. It represents a scale reading of voltage from a photon multiplier which is not calibrated in terms of absolute intensity of light from the bulk semiconductor, but which for purposes of showing line width narrowing, has been normalized to display each curve on a unity scale. From measurements of resistivity and Hall effect as a function of temperature, it was determined that the electrons came from a donor center with an ionization energy of 0.012 ev., in agreement with published data on undoped CdTe. The electron mobility near room temperature was dominated by lattice scattering. Applying fields above 8500 volts/cm. across a sample 0.3 mm. in length produced current oscillations at 0.5 gHz.

A second set of samples was fabricated from an indium-doped ingot with a free carrier concentration of $2\times10^{16}$ cm.$^{-3}$. An electron mobility of 40 cm.$^2$/volt-sec. at room temperature, varied with temperature as $T^{3/2}$, leading to the conclusion that electrons were scattered predominately by ionized impurities. The current-voltage relation for this material and the previous ingot differed radically. Instead of saturating near 8500 volts/cm., the current continued to rise linearly with field until 12,000 volts/cm. At this point there was a rapid increase in current, and simultaneously near-infrared radiation was emitted from the entire sample. The radiation spectrum has a peak at 9000 A., slightly below the bandgap of CdTe, and a half-width of 500 A., and is therefore identified as electron-hole recombination. Hence, the current increase is attributed to impact ionization by hot electrons.

Behavior intermediate between these two extremes was observed in another indium-doped CdTe boule which had a room temperature carrier concentration of $10^{15}$ cm.$^{-3}$ and a mobility of 820 cm.$^2$/volt-sec. Comparing the temperature dependence of the mobility of this sample with that of the heavily doped CdTe shows that the effects of ionized impurity scattering are much reduced. The room temperature mobility value of the three materials indicates that electron scattering in this sample with intermediate doping has a somewhat larger contribution from ionized impurities than was the case for the undoped CdTe which displayed the Gunn effect. The current voltage characteristic of samples from this boule shows current saturation, a necessary feature of the Gunn effect. However, oscillations do not develop because impact ionization (with associated recombination radiation) sets in sharply at a field of 10,000 volts/cm.

The comparative behavior of these three materials can be understood by inclusion of ionized impurity scattering in the theory of Butcher and Fawcett, Proc. Phy. Soc. 86, 1205 (1965), for the negative differential mobility that leads to the Gunn effect. Butcher and Fawcett assume that electron-electron collisions insure that a drifted Maxwellian form of the distribution function is appropriate. The lower and upper valley carrier concentrations $n_1$ and $n_2$, the corresponding drift momenta $$m_1u_1=\hbar d_1, m_2u_2=\hbar d_2$$

and the temperatures $T_1$ and $T_2$ are found by forcing the drifted Maxwellian to conserve particle number, lattice momentum and energy. $m_1$ and $m_2$ are masses in the lower and upper valleys; $\hbar$ is Planck's constant; $u_1$ and $u_2$ drift velocities of carriers in the lower and upper valleys; and $d_1$ and $d_2$ are the wave vectors of the carriers in the lower and upper valleys.

The essential point is that scattering of light carriers from heavy impurities is elastic. Thus the energy balance equation is unchanged by impurities and, likewise, the particle conservation equation for $n_2/n_1$, which depends on inelastic intervalley scattering processes, is unchanged. Only their momentum balance equation is altered by the presence of impurities, with the obvious result that the effective lower and upper valley mobilities $\mu_1$ and $\mu_2$ decrease as the number of impurities $n_{imp}$ increases. From the energy balance, in steady state, the energy gained per unit time $$\frac{n_i \hbar e d_i F}{m_i}$$

by carriers in the field F must be given up to the lattice through inelastic optical phonon scattering. Since the mobilities are reduced by impurities, a larger field is needed to do the same rate of work on the electrons. Therefore, a larger field is necessary in the presence of impurities to reach given values of $T_1$ and $T_2$. The dependence of $n_2/n_1$ on the drift velocities appears to be relatively weak so that $n_2/n_1$ scales roughly the same way with the electric field as do $T_1$ and $T_2$.

The mean drift velocity V is $$nV=n_1\mu_1F+n_2\mu_2F$$

where $$n=n_1+n_2$$

Differentiating, $$n\frac{dV}{dF}=\mu_1\left\{\left[n+n_2\left(\frac{\mu_2}{\mu_1}-1\right)\right]-\frac{dn_2}{dF}\left(1-\frac{\mu_2}{\mu_1}\right)F+\left[\frac{(n-n_2)\,d\mu_1}{\mu_1 F}+\frac{n_2}{\mu_1}\frac{d\mu_2}{dF}\right]F\right\}$$

The Gunn effect depends on having a negative value of $dV/dF$ over some region of electric field. The first term in square brackets is always positive. The second term on the right makes a negative contribution if $\mu_2<\mu_1$ since $dn_2/dF>0$. $n_2(F)$ changes in such a way that $dn_2/dF$ is decreased by impurities. The ratio $\mu_2/\mu_1$ increases or decreases with impurity concentration depending on whether $\mu_2^{imp}/\mu_1^{imp}$ is greater than or less than $\mu_2^0/\mu_1^0$, where $\mu_1^0$, $\mu_2^0$ are the mobilities determined by polar optical mode scattering. Using the well known expressions for ionized impurity dominated mobility and polar optical dominated mobility, the condition for $\mu_2/\mu_1$ to increase in the presence of ionized impurity scattering is found to be $$\frac{m_2T_2}{m_1T_1}\frac{e^{\theta/T_1}-1}{e^{\theta/T_2}-1}>1$$

where $\theta$ is the Debye temperature. For sufficiently large $m_2/m_1$, this can be satisfied provided $T_1/T_2$ does not become too large. Thus, the second term on the right becomes *less* negative as $n_{imp}$ increases. The terms involving $d\mu_1/dF$ and $d\mu_2/dF$ can also make negative contributions if polar optical scattering dominates the mobilities, since in this case $\mu_1$ and $\mu_2$ are decreasing functions of $T_1$ and $T_2$ and $dT_1/dF$, $dT_2/dF>0$. However, the impurity dominated mobilities increase with $T_1$ and $T_2$. Thus, the negative contribution of these terms also is reduced as $n_{imp}$ increases. For $n_{imp}$ above some critical value, no region of negative slope should occur in the drift velocity vs. field curve and the Gunn effect disappears. As higher fields are applied the electrons heat up further until impact ionization sets in. This is the trend observed in the experimental results.

Linewidth narrowing attributed to super-radiance has been observed in near bandgap radiation due to the recombination of impact ionized carriers in n-type CdTe at room temperature. The light emission was associated with a current breakdown that occurred at a threshold field of 12,000 v./cm. in highly compensated n-type samples with a net room temperature electron concentration of $2\times10^{16}$ cm.$^{-3}$. There was no evidence of current saturation or Gunn effect in these samples although both these phenomena were observed in samples from material with lower room temperature electron concentrations of $5\times10^{14}$ cm.$^{-3}$.

The recombination radiation studies were made on a number of samples from one boule in which the resistivity ranged from .06 to 8 Ωcm. The room temperature electron mobilities observed in this material ranged from a low of 40 to a high of 750 cm.$^2$/V.-sec. These low values, together with the observation that the mobility decreased as the temperature was decreased, show that ionized impurity scattering is dominant in all of these samples, even at room temperature. The samples were approximately 0.6 mm. x 0.8 mm. in cross section and 0.3 mm. long in the direction of current flow. They were cleaved from single crystal sections of the original boule and indium-sliver solder contacts were applied. The samples are driven with 25 ns. wide pulses from a stripline source with a 2 ohm impedance.

Figure 3:
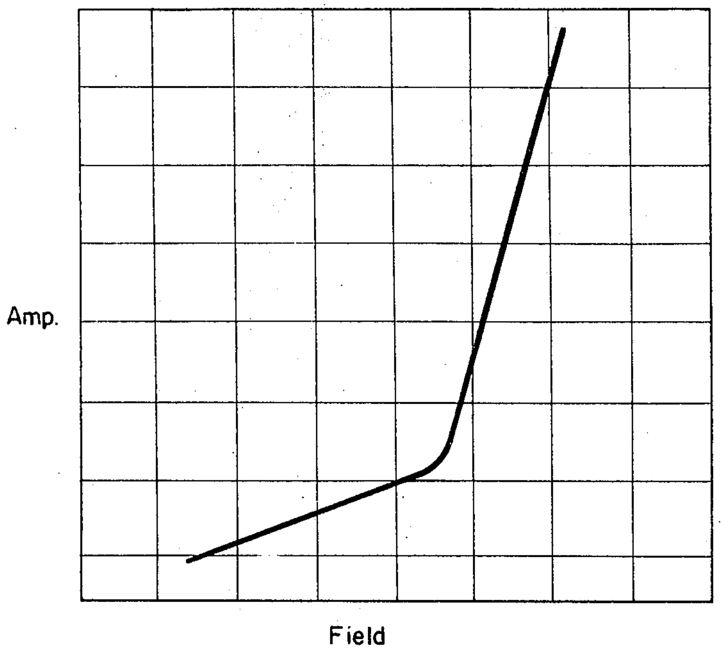
FIG. 3 illustrates a photographic trace of the current-voltage characteristic of n-type cadmium-telluride heavily doped with indium. The voltage scale is 50 volts/division, and the current scale is 11.5 amps/division.

The current voltage ($I-V$) characteristics of the samples (FIG. 3) of heavily indium doped CdTe show a current breakdown at 12,000 v/cm. accompanied by a marked increase in the recombination radiation emitted. The voltage scale is 50 v./division and the current scale is 11.5 amps/division. When viewed with an infrared image converter, the emission appears to be uniform over the entire sample. Occasionally, dark striations parallel to the direction of the current flow are observed in the uniform field, but narrow filaments have not been seen. The emission spectrum peaks at approximately 8900 A. (1.40 ev.), just below the room temperature bandgap at 1.43 ev., and so is attributed to electron-hole recombination which probably proceeds through the shallow impurity centers present in the highly compensated materials. The peak intensity and halfwidth of the emitted radiation show marked dependence on the current in the breakdown region.

Figure 4:
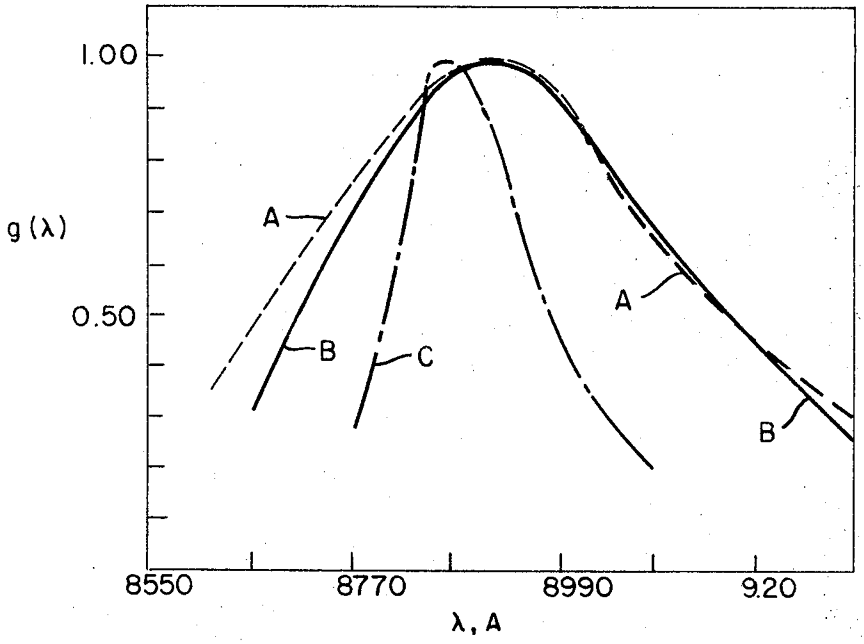
FIG. 4 illustrates normalized spectra of recombination from n-type cadmium telluride at three different pump currents.

FIG. 4 is a normalized set of curves of radiation from such material according to this invention, at $I=178$ amps, $\Delta E=0.080$ ev. (curve A), at $I=206$ amps, $\Delta E=0.070$ ev. (curve B), and at $I=275$ amps, $\Delta E=0.029$ ev. Linewidth narrowing with increasing current, characteristic of superradiance, is observed in the narrowing of the wavelength from curve A to curve C at about 8900 A.

Figure 5:
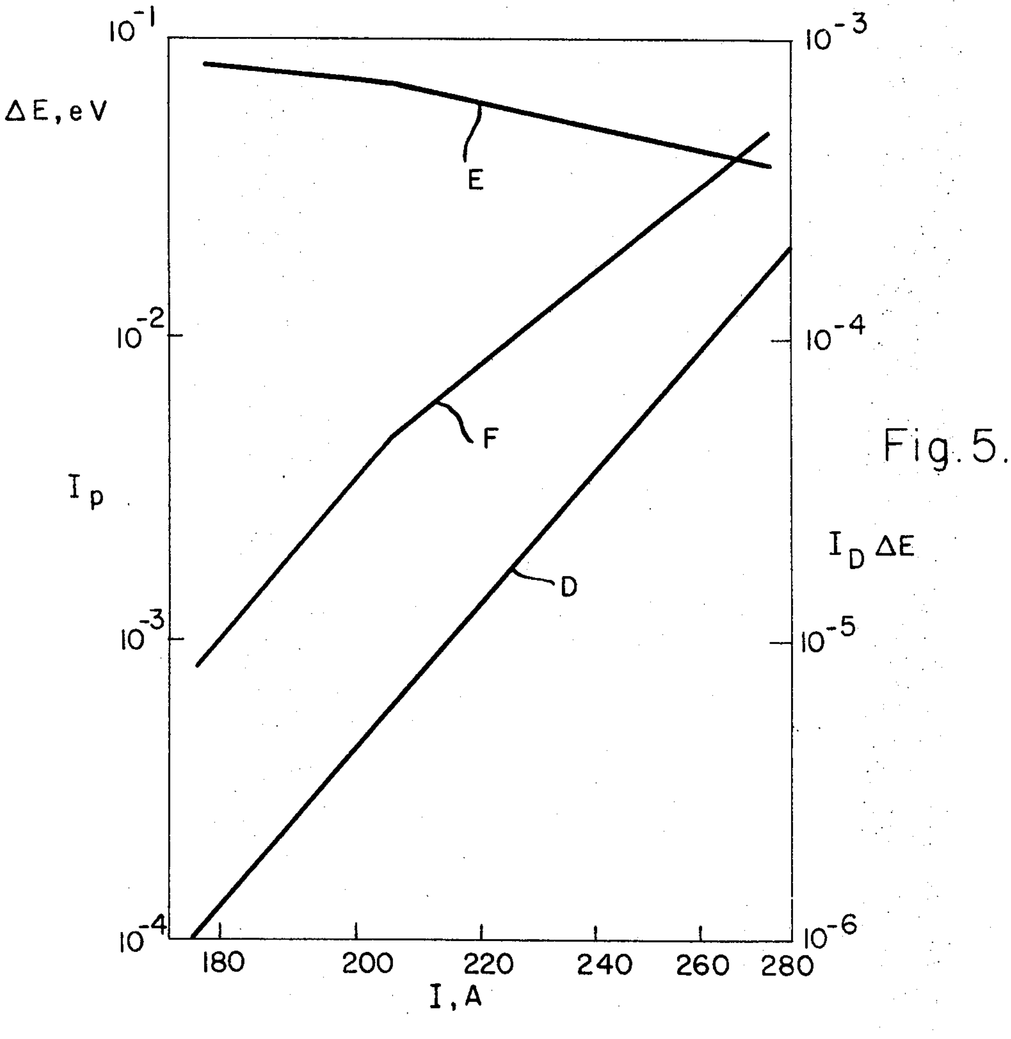
FIG. 5 illustrates, on log-log plot, peak intensity $I_p$, half width $\Delta E$, and the product of the two $I_p\Delta E$ as a function of pump current.

In FIG. 5, the peak intensity, $I_p$, the half-width, $\Delta E$, and the product of peak intensity and half-width, $I_p\Delta E$, for this particular sample are plotted as a function of pump current. Vertical and horizontal scales are logarithmic. These results are representative of the data taken on a number of samples studied. In all cases, the line narrowed with increasing pump current until its width was reduced by a factor of almost 3. At higher drive currents the emission line once again broadened and matched vedy closely the line shape observed at low pump levels. Both $I_p$ and $I_p\Delta E$ increase superlinearly with current.

The observed line narrowing is presumed to be due to superradiance. The ratio of the half-width of the spontaneous emission is given by $$\frac{\delta\nu}{\Delta\nu}\cong\frac{1}{\sqrt{ag(\nu_o)L}}$$

$\delta\nu$ is the observed super-radiant line-width, $\Delta\nu$ is the spontaneous emission linewidth, $g(\nu)$ is the normalized spontaneous line shape function, $\nu_0$ the frequency of peak intensity and L is the length of the sample in the direction of observation. The quantity $a$ is given by $$a=\frac{(c/n)^2N}{8^{\pi\nu^2}T_{rad}}$$

N is the inverted carrier population density, $n$ is the index of refraction of the medium and $T_{rad}$ is the radiative recombination time. With the substitution, $$VN/T_{rad}=Iq/e$$

(I is the current, $q$ the quantum efficiency, V the sample volume, $e$ the charge on the electron), an expression for the quantum efficiency in terms of experimentally observable quantities is $$q=\frac{(\Delta\nu)^3 8\pi\nu^2 eV}{(\delta\nu)^2 L(c/n)^2 I}$$

For the sample whose properties are illustrated in FIGS. 4 and 5, $q$ is found to be 5.6. Values between 5 and 10 were observed in all samples where the effect was found.

A quantum efficiency greater than one is not surprising if (*1*) the recombination lifetime $\tau$, due to all possible processes is less than the transit time T, of a carrier across the sample, and (2) the probability $q$ of photon emission during a recombination is high, i.e. $q'\approx\tau/T_{rad}\approx 1$. The quantum efficiency $q$, calculated in the preceding paragraph is the product of the mean number $m$, of recombination events a carrier undergoes in traversing the sample and the probability $q'$. Since $$m=/\tau,\eta=m\eta'=T/T_{rad}$$

and with the substitution $T=L/\mu E$ (L is the length of the sample, $\mu$ the electron mobility, and E the electric field intensity), the radiative recombination time is:

$$T_{rad}=1/\mu Eq=2.3\times 10^{-9}\text{sec.}$$

It has been assumed that the low field mobility determined from the ohmic portion of the $I-V$ curve is applicable in the breakdown region.

Since on the average an electron experiences a potential drop of $V_o=EL/m=63$ volts in one mean drift distance, the overall power efficiency of the sample can be estimated assuming $q'=1$ as $$P=(h\nu_o/e)/(EL/m)\cong 1\%$$

The pumping mechanism producing the electron-hole density necessary for super-radiance is presumed to be impact ionization. The threshold fields for impact ionization in polar semiconductors for the case where optical phonon scattering is dominant, for recombination times of $10^{-9}$ sec. have been estimated by R. Granger, Phys. Stat. Sol. 16, 599 (1966), to be of the order of 6000 v./cm. if the mean time required for a hot carrier to produce an electron-hole pair is $10^{-12}$ seconds. The threshold for impact ionization increases as this time increases and also if other scattering mechanisms, such as ionized impurities, are present. The observed threshold field of 12,000 v./cm. is consistent with these estimates.

Linewidth narrowing by cooling of a hot carrier distribution due to interaction with optical phonons would in this case produce linewidth narrowing less than 10%, and ionized impurity scattering would tend to quench the effect. The Gunn effect is found in lightly doped materials, as for example, in fields of 8500 volts/cm. across a 0.3 mm. sample of cadmium telluride, produced by the Bridgeman technique and having a room temperature carrier concentration of $5\times 10^{14}/\text{cm.}^3$ and a mobility of 900 $\text{cm.}^2$/volt sec (n-type), current oscillations were produced at 0.5 gHz. At higher doping levels, as for example indium doped cadmium-telluride with a free carrier concentration of $2\times 10^{16}/\text{cm.}^3$, current rises linearly until the field is about 12,000 v./cm. above which there is a rapid increase in current accompanied by near infrared radiation as previously described. Thus in materials which can produce the Gunn effect, that effect may be suppressed, and bulk recombination produced, by heavily doping the material.

What is claimed is:

1. An electroluminescent light source, comprising:

(a) a polar cadmium telluride semiconductor having a sufficiently high doping level to suppress the Gunn effect;

(b) pulse generator means for generating essentially square wave pulses at a sufficiently low frequency to avoid overheating of the semiconductor and of a sufficient drive current to produce impact ionization in the semiconductor; and (c) circuit means comprising ohmic contacts to a crystal face for connecting the pulse generator to the n-doped semiconductor.

2. A source according to claim 1 wherein the generator means is capable of producing pulses about 25 nanoseconds wide, sufficient to produce in the semiconductor an electric field of 12,000 volts/cm.

3. A light source according to claim 1 wherein the semiconductor is n-doped cadmium telluride.

4. A light source according to claim 1 wherein the generator means is capable of producing pulses sufficient to produce in the semiconductor an electric field in excess of about 6000 volts/cm.

References Cited

UNITED STATES PATENTS 3,412,344 11/1968 Pankove ---------- 331—94.5

OTHER REFERENCES

Recombination Processes Following Impact Ionization by High-Field Domains in Gallium Arsenide, P. D. Southgate, J. Applied Phy., vol. 13, No. 12, pp. 4589–4595, November 1967.

Microwave Osc. in High-Resistivity GaAs, G. F. Day, IEEE Transactions, vol.-ed. 13, no. 1, pp. 88–94, January 1966.

Suppressing Space Charge Improves Gunn Effect, L. Weller, Electronics, February 1967, pp. 127–128.

Light-Emitting Semiconductors, F. F. Morehead, Sci. Amer., May 1967, pp. 109–120.

Infrared Radiation in Bulk GaAs, K. K. N. Chang, App. Phys. Lett., vol. 8, no. 8, April 1966, pp. 196–197.

JAMES W. LAWRENCE, Primary Examiner

D. O'REILLY, Assistant Examiner

U.S. Cl. X.R.

317—234; 331—107